United States Patent [19]

Zaslavsky et al.

[11] 4,154,549

[45] May 15, 1979

[54] METHOD OF SEALING SOIL AND OTHER MATERIALS AGAINST THE LEAKAGE OF LIQUIDS AND GASES

[75] Inventors: Dan Zaslavsky; Giora Biran; Gideon Sinai, all of Haifa, Israel

[73] Assignee: Technion Research & Development Foundation Ltd., Haifa, Israel

[21] Appl. No.: 896,984

[22] Filed: Apr. 17, 1978

Related U.S. Application Data

[63] Continuation-in-part of Ser. No. 734,174, Oct. 20, 1976, Pat. No. 4,098,089.

[30] Foreign Application Priority Data

Oct. 20, 1975 [IL] Israel ........................................ 48328

[51] Int. Cl.² ............................................. E02B 13/00
[52] U.S. Cl. ..................................................... 405/38
[58] Field of Search ................. 61/13, 12, 11, 10, 726; 405/38, 37

[56] References Cited

U.S. PATENT DOCUMENTS

| | | | |
|---|---|---|---|
| 3,309,875 | 3/1967 | Niederwemmer | ......................... 61/13 |
| 3,398,542 | 8/1968 | Hansen et al. | ......................... 61/13 X |

*Primary Examiner*—Jacob Shapiro
*Attorney, Agent, or Firm*—Browdy & Neimark

[57] ABSTRACT

Seepage of water through soil is considerably reduced by providing plural layers of adjacent, thin impermeable strips wherein the strips of an overlayer are staggered by a half strip's width with regard to the strips of the underlayer, and the widths of the strips are substantially greater than the gaps between adjacent strips and the space between layers.

11 Claims, 5 Drawing Figures

METHOD OF SEALING SOIL AND OTHER MATERIALS AGAINST THE LEAKAGE OF LIQUIDS AND GASES

FIELD OF INVENTION

This application is a Continuation-in-part of application Ser. No. 734,174, filed Oct. 20, 1976, now U.S. Pat. No. 4,098,089, issued July 4, 1978, the contents of which are here incorporated by reference.

The present invention relates to the sealing of soil and other porous materials against the percolation of water and other liquids and of gases, and more especially to the provision of means for considerably reducing the seepage of water through the lining of reservoirs, dams, or other water-retaining earthwork.

BACKGROUND OF THE INVENTION

The need to store water in excavated reservoirs, or to prevent water seepage through earth dams has, since ancient times, exercised the human mind with a view to seeking ways for making soil impervious. One of the earliest methods of preventing leakage consisted in covering the porous ground with brickwork, stone masonry, or an impervious clay cover. These thick and heavy covers became too expensive with increasing cost of labor, and new ways were looked for. It is modern practice to apply a relatively thin, continuous layer of an impervious material to the sides and bottoms of the structures concerned (e.g. see U.S. Pat. No. 3,309,875), either by spraying substances capable of setting (e.g. see U.S. Pat. No. 3,585,804) or by stretching strips of thin sheeting and joining them along their edges. Another way is to make the soil itself impermeable by compacting it—provided that it lends itself to this process—or by chemically treating its upper layer.

In order to prevent physical damage to the comparably thin, impermeating layer it is common practice to protect the impervious material forming it, by covering it with an additional layer of soil; but in spite of the protection, small holes or tears are inevitable: they are the results of such haphazard causes as careless treatment, insufficient sealing along the seams, natural earth movement, growth of roots and others.

Even small holes may eventually result in considerable seepage, since the flow through a hole in a thin membrane represents flow that would result without a membrane altogether but through an area larger than that of the hole. In other words, small holes reduce the resistance to flow much more than may be expected having regard to their area.

Furthermore, covering a large area with impermeable strips of sheeting requires very careful laying and the aligning of their edges subsequently to being joined, and the cost of the entire operation is considerably increased by the final earth cover that must be placed over the sheeting as protection against physical damage, rendering the impermeating of a reservoir very expensive, even if low-priced sheet material is used. One attempt to lay a sub-soil impermeable strip is shown in U.S. Pat. No. 3,590,588.

SUMMARY OF THE INVENTION

It is, accordingly, an object of the invention to overcome deficiencies in the prior art, such as those mentioned above.

It is another object to provide for the improved sealing and other porous materials against the percolation therethrough of liquids and/or gases.

In order to overcome the drawbacks in the prior art noted above, it is an object of the present invention to dispense with a continuous membrane of impervious material extending across the entire area of a reservoir or dam.

Another object is to reduce the high costs of construction resulting from a large amount of manual labor, by employing mechanical means for laying impermeable strips of material and by leaving their respective edges more or less close to each other but unjoined, unglued, and unadhered in any way.

In accordance with the invention the sealing of an area of soil against the seepage of a liquid, such as e.g. water, sewage or oil, consists in principle, of laying into the soil a first, lowermost layer of strips made of an impermeable, thin sheet material in substantially parallel alignment and with a gap remaining between each two adjacent edges, such laying to take place at a predetermined distance from the soil surface; and laying a second layer of strips of impermeable sheeting substantially parallel with the lowermost layer but at a shorter distance from the soil surface, the alignment of the said individual strips being substantially parallel with those of the lowermost layer but positioned in a staggered arrangement, the central axes of the strips of the second layer lying substantially perpendicularly above the central axes of the gaps between the two strips immediately below.

In a preferred embodiment of the method, the second layer is laid at a relatively small distance from the surface of the lowermost layer, the two layers being separated by soil.

Water seeping through the gap between two adjoining strips in the upper layer has to travel through the relatively long and narrow duct created between two superposed sheet strips—about half the width of a strip—until reaching the gap in the lowermost layer; this results in a large flow-resistance permitting only a small quantity of liquid to be forced into the soil below the lowermost layer by the static pressure of water contained in the reservoir. Since the flow resistance increases with decreasing distance between the layers, it is of importance to lay a second layer as close to the top of the first as mechanical means permit. For this reason, three or more layers, staggered in the manner described, may be provided for deep-water reservoirs, which are characterized by the high static pressure they exert.

GENERAL DESCRIPTION OF EMBODIMENTS

Laying strips in the afore-described manner is advantageously performed by the method described in our co-pending patent application Ser. No. 734,174, wherein a thin strip of sheeting is stretched underground by a hollow blade guided at a predetermined depth below the ground surface, and wherein the prefabricated strip is contained in rolled-up form inside the hollow blade and fed out through its open trailing edge.

If no suitable tool is available, the sheets may be laid manually on a previously excavated surface, in the arrangement described, then covered by a relatively thin layer of soil, and that layer of soil in turn covered by a second layer of sheet strips overlapping the gaps between the sheets of the first layer. In this fashion a number of alternating layers of soil and sheet strips may be laid as required by the properties of the soil and the dimensions of the reservoir. It is obvious that mechanical laying is much to be preferred because of the lower costs, especially where a large area is to be treated.

A complementary feature of the invention is the provision of drainage means, e.g. perforated pipes, in the gaps between adjacent strips, the pipes being adapted to collecting the water arriving at and seeping through the gap and convey it to a reservoir, a tank, or other containers, at a lower level. The mechanical insertion of pipes into the soil together with sheeting has already been described in the co-pending patent application Ser. No. 734,174.

In another preferred embodiment of the method, each sheet strip is laid in V-shape, resulting in a substantially wave-shaped layer with a gap running along the crest of each wave. After the lowermost wave-shaped layer has been placed in position in the manner just described, a similar, second layer of V-shaped sheets is laid above the said lowermost layer, the waves and gaps of the said second layer being staggered through being shifted a half strip's width. This arrangement permits a close approach between the edges of the sheet strips of the lower layer and the central trough portion of the sheets immediately above, thus further increasing the resistance to water flow.

BRIEF DESCRIPTION OF THE DRAWINGS

For a better understanding of the invention, possible embodiments thereof will now be described with reference to the accompanying drawings which illustrate cross sections of several proposed arrangements of sheet strips, it being understood that such embodiments are merely exemplary.

DETAILED DESCRIPTION OF EMBODIMENTS

Figure 1:
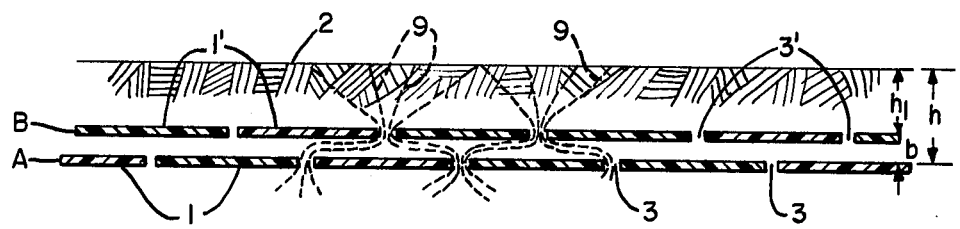
FIG. 1 is a schematic section through a soil portion with flat sheet strips arranged in two layers.

Referring now to FIG. 1 of the drawing, a lowermost layer A of parallel strips 1 of water-impervious sheeting (shown in cross section) is laid at a depth h below the soil surface 2 intended to form the bottom of a reservoir or the face of an earth dam. The strips—which are preferably of thin, pliable film such as polyethylene of preferably 10–40$\mu$ thickness, commercially supplied in rolls containing hundreds of meters—extend beneath the surface of the reservoir throughout its length and breadth and are advantageously laid by the method described and claimed in our co-pending patent specification Ser. No. 734,174. By that method a hollow blade is dragged forward underground at the depth h, and a roll of sheeting, contained in its hollow space, is unrolled while the blade advances, the strip being fed out through the slit at the rear edge of the said hollow blade. This method enforces the leaving of gaps 3 between adjacent strips, by virtue of the fact that the width of the blade is somewhat greater than that of the strip, extending beyond it at either end; the minimum width of the gap 3, accordingly, equals the dimension of this excess width.

A second layer B is superposed on the lower layer A at a level $h_1$ beneath the soil surface 2, the difference between levels h and $h_1$ being a preferably minimized width b. The upper layer B is built up of sheet strips 1' having the same width as those in the lower layer and, similarly, gaps 3' are left between each two adjacent strip edges.

The sealing against penetration of water acts on the principle of the so-called labyrinth seals with the novel addition that the space available for flow is filled with porous material rather than open space. The flow in such a labyrinth is shown, in an idealized (schematic) manner, by means of the broken lines 9. Water seeps through the soil from every point of the reservoir bottom 2 through the upper gaps 3' into the soil-filled space between the two layers of strips. In that space the direction of the flow becomes progressively more horizontal until it reaches the gaps 3 of the underlying layer 4, through which it penetrates into the soil underneath.

Figure 2:
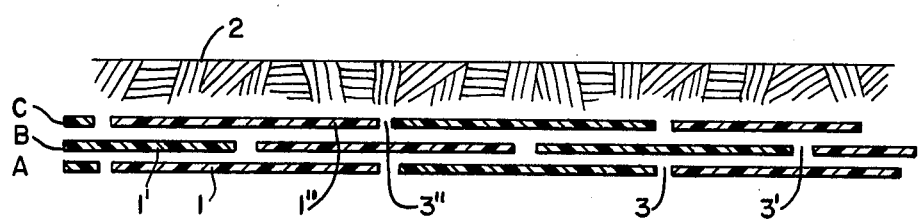
FIG. 2 is a schematic section through a soil portion with flat sheet strips arranged in three layers.

The area available to the flow is primarily reduced by the ratio between the gap width and the strip width. The resistance to flow is thus due to a contraction of the stream lines. Another major factor increasing the flow resistance is the narrowness of the duct of width b formed between the layers A and B, a ratio of $b/a = 1/20$ and less being technically feasible. That ratio will reduce the seepage by a factor of at least 10 compared with that which would occur in untreated soil, thanks to the narrow and labyrinthine path the water is forced to follow. The length of that path can be doubled by a third layer C of strips 1"—having gaps 3" therebetween—on top of the two layers, A and B. A cross section of such an arrangement is self-evidently illustrated in FIG. 2. In each arrangement the total resistance to flow is more or less the sum of the individual resistances due to radial stream line contraction and to an extended flow path of narrow dimensions.

Figure 3:
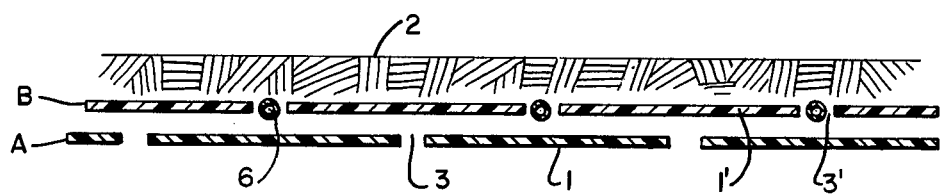
FIG. 3 is a schematic section through a soil portion similar to that illustrated in FIG. 1, but with drainage pipes provided in the gaps between adjacent strips.

The almost total elimination of water passage through seepage can be obtained by placing drainage means, e.g. perforated pipes 6, into and along the gaps between each two adjacent sheet strips, as illustrated in FIG. 3. This drainage means collects water and conveys it out of the reservoir from where it may be pumped back. The function of such drainage means is to reduce the hydraulic head in the gap from that prevailing in the reservoir to a value close to atmospheric pressure. The head gradient between the area outside the pipes and the underlying soil thus becomes relatively small. The maximum gradient in a vertical flow is unity. The maximum gradient along a horizontal flow path is the difference of elevation between two membrane layers divided by half the width of a single membrane. As an example, in a reservoir with 5 meters head, the gradient along the horizontal gap between two membranes (4 meters width) will be about 2.5. After installing drainage pipes at the upper joints, the gradient will be reduced to about 0.1 (with 20 cm vertical spacing h between membranes). This makes for a 25-fold reduction in seepage.

Water seepage beyond the drainage pipes is thereby substantially eliminated. In fact, the quantity of water escaping from the reservoir due to placement of such drainage pipe is greater than that which would penetrate into the soil without the provision of such drainage pipes, but owing to the possibility of recovering the water and redirecting it, the actual water loss through seepage becomes negligible. If no tank situated at a lower level can be provided, the drainage pipes are advantageously connected to the suction side of a water pump or other suitable device for returning the collected water to the reservoir. If the water is to be taken for use, the drainage water should be used first.

Figure 4:
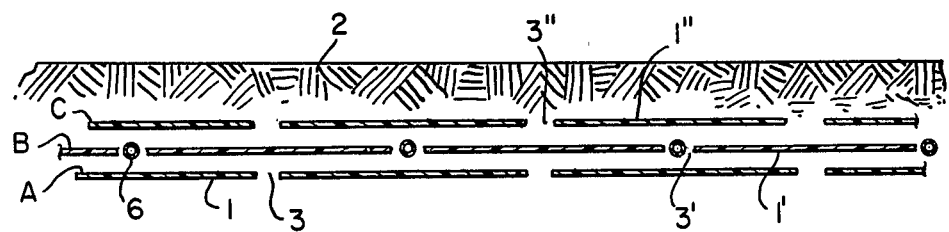
FIG. 4 is a schematic section through a soil portion with three layers of strips, wherein the central portion is provided with drainage pipes between adjoining strips.

FIG. 4 illustrates an arrangement of three layers of sheet strips, A, B and C, with drainage pipes laid into the gaps of the central layer only. This arrangement, while maintaining the drastic seepage loss reduction achieved by the arrangement shown in FIG. 3, has the added advantage of reducing the rate of flow in the drainage pipes, thus permitting the use of smaller recirculating pumps.

Figure 5:
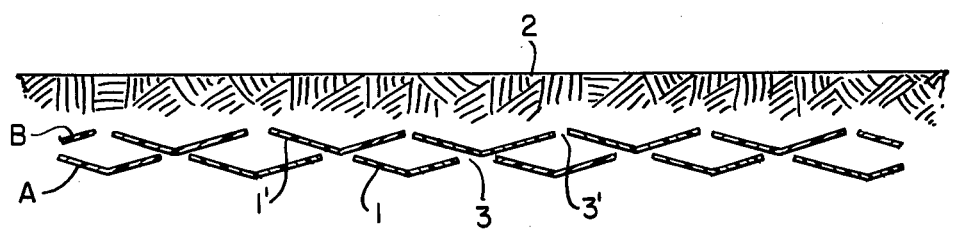
FIG. 5 is a schematic section through a soil portion with two layers of sheet strips, each laid in V-shape.

FIG. 5 illustrates an arrangement of sheet strips laid in V-section. This permits a very close approach between the edges of the lower strips to the center portions of the strips above them, and even an accidental cutting into the lower layer during the deposition of the upper layer will not appreciably damage the system as a whole, as would be more likely the case with purely level strips. Moreover, the V-section arrangement makes for an even higher flow-resistance to seepage.

A main advantage of the discontinuous multi-layer arrangement, several embodiments of which have been described above, is that it represents a means for inexpensively sealing off a large surface area when, for example, utilizing the method of laying membranes taught by the aforementioned co-pending application Ser. No. 734,174; but other methods may also be used to advantage. The discontinuous multi-layer method is thus especially useful for large reservoirs, which can be economically seepage-proofed by a tractor pulling the hollow blade device described in Ser. No. 734,174.

The need to seal the edges of the reservoir area presents certain technical difficulties. Experience in performing the work taught by the method of the present invention in conjunction with that of Ser. No. 734,174 on slopes of 1:4 has already been gained. Where an earth dam, or the walls of a reservoir, are more steeply inclined, the sheet strips will be found to be more advantageously laid by hand. Moreover, one or the other layouts of sealing strips referred to at the beginning of the present specification may be used for sealing such slopes. Where it is desirable, for one reason or another, to use the machine of Ser. No. 734,174 rather than manual labor, the hollow blade tool may be pulled by means of a winch-and-cable arrangement from the top of the slope.

Another advantage of the method proposed here is the immunity of the system to the effects of accidental tears and punctures; as long as such holes in superposed layers do not coincide, i.e., are not substantially aligned on a common vertical axis, water will continue to be forced to flow along a labyrinthine path, and the resistance to seepage will remain sufficiently high. This is due both to the radial convergence and subsequent divergence of the flow in the vicinity of, and through, the holes, and to the relatively narrow spacing between superposed layers. Only if the holes multiply greatly, are more than a few millimeters in diameter, and become closely spaced, with distances between adjacent perforations approaching that between two superposed layers, will the rate of seepage increase significantly and may—to all intents and purposes—approach that of the untreated soil.

The present method is superior to any method involving a continuous membrane because of the relatively low accuracy required in the laying of the sheet strips. As long as the gaps between the edges of adjacent strips do not vary materially, the overall efficacy will not be impaired. Moreover, a continuous layer cannot be laid underground by placing strips side by side and then joining them by, e.g. heat sealing, glueing, or other methods known to the art, since such joining must be made in the open air, not subterraneously with air largely excluded.

Other known methods, such as subterraneously spraying liquid asphalt or tar, are relatively more expensive, as the cost of the material needed to make a watertight layer of sufficient thickness is a major factor. Furthermore, the pertinent methods so far developed to the point of feasibility and employing spraying techniques produce at best semi-permeable membranes, their permeability being of the order of 1–2 cm per hour, which is far too high for most uses.

The method of the present invention is not limited to the laying of polyethylene sheeting, since other suitable impermeable material may be laid in a similar way. It is, for instance, proposed to lay strips made of other thermoplastic or thermosetting material, metal foil, or impregnated paper or fabric. Stable or decomposable materials should be considered subject to special local requirements.

The same method may obviously be used for sealing soil against the seepage of other liquids, such as oil, sewage, brines, acid, or the like; and even gaseous materials enclosed in containers with bottom walls of pervious or semi-pervious materials may be successfully stored in reservoirs treated by the method of the invention.

The drainage pipes as in FIGS. 3 and 4 are preferably laid simultaneously with the strips by a method described in the afore-cited application, Ser. No. 734,174, but there is no objection to laying them separately when suitable equipment is not available. The pipes may be of any stable material and may be perforated in any manner known to the art.

A similar system may be used when the reservoir bottom and walls are not made of natural soil but of stabilized soil, concrete, asphalt mixes, or other building materials. The method of the invention then has the additional advantage of providing a structural continuity of the building material as well as impermeabilization.

A discontinuous membrane system, and especially one in combination with drainage pipes as described, has the additional structural advantage of permitting a release of pressures where this is important, such as in fast drawdown of water behind earth dams, the prevention of erosion and the like.

It will be obvious to those skilled in the art that various changes may be made without departing from the scope of the invention and the invention is not to be considered limited to what is shown in the drawings and decribed in the specification.

What is claimed is:

1. A method of sealing an area of soil or other granular material against the seepage of a liquid or a gas, comprising laying into the soil a first, lowermost layer of strips made of an impermeable, thin sheet material in substantially parallel, non-contiguous alignment and with a gap remaining between each two adjacent edges, such laying taking place at a predetermined distance beneath the soil surface;

laying a second layer of substantially parallel, non-contiguous strips of impermeable sheeting above the lowermost layer at a shorter distance from the soil surface, separated from the lowermost layer by a layer of soil, the alignment of the said individual strips being substantially parallel with those of the lowermost layer but positioned in a staggered arrangement, the central axes of the strips of the second layer lying substantially perpendicularly above the central axes of the gaps between two strips immediately below;

the width of said strips being substantially greater than both the widths of said gaps and the distance between said first and second layers.

2. A method of sealing a soil area against seepage as in claim 1, wherein a third layer of strips is placed in the soil above the second layer at a short distance therefrom, staggered by a half strip's width.

3. A method of sealing a soil area against the seepage of a liquid as defined in any of claims 1 or 3, wherein each strip is laid underground by dragging through the soil, at a predetermined depth, a hollow cutting blade having an interior chamber and a leading cutting edge, said chamber containing a supply of said thin preformed strip material, and feeding said strip material from said interior chamber into the soil from the rear of said blade as said blade cuts through the soil.

4. A method of sealing a soil area against the seepage of a liquid as defined in any of claims 1 or 3, wherein the parallel strips constituting any of the layers are laid flat in one continuous plane.

5. A method of sealing a soil area against the seepage of a liquid as defined in any of claims 1 or 3, wherein each strip is laid in V-section so as to form a complete layer in wave form, with a gap running along the crest of each wave.

6. A method of sealing a soil area against the seepage of a liquid as defined in any of claims 1 or 3, further comprising laying drainage means in the gaps between adjoining strips of at least one layer.

7. A device for the sealing of soil against the seapage of liquid therethrough, comprising:
a first, lowermost layer of soil;
a first, lowermost layer of strips of an impermeable, thin film material in substantially parallel, non-contiguous alignment and with a gap remaining between each two adjacent edges of adjacent strips, said lowermost layer of strips overlying said lowermost layer of soil;
a second layer of soil overlying said first, lowermost layer of strips;
a second layer of substantially parallel, non-contiguous strips of impermeable film lying above said second layer of soil, the alignment of said individual strips of said second layer of strips being substantially parallel with those of the lowermost layer of strips, but positioned in a staggered arrangement, the central axes of the strips of the second layer of strips lying substantially perpendicularly above the central axes of the gaps between two strips lying below the lowermost layer of strips, and
a third layer of soil overlying said second layer of strips of impermeable film material;
the widths of said strips being substantially greater than both the widths of said gaps and the thickness of said second layer of soil.

8. A device in accordance with claim 7, further comprising a third layer of strips located in said third layer of soil above the second layer of strips, said third layer of strips being staggered by a half strip's width in relation to said second layer of strips.

9. A device in accordance with any of claim 7 or 8, wherein each strip is, in longitudinal cross section, in the shape of a V-section so as to form a complete layer in wave form, with a soil-filled gap running along the crest of each wave.

10. A device in accordance with either of claims 7 or 8, further comprising drainage means in the gaps between adjoining strips of at least one layer of strips.

11. A device in accordance with claim 10, wherein said drainage means comprise perforated pipes.

* * * * *